Patented Dec. 11, 1951

2,577,788

UNITED STATES PATENT OFFICE 2,577,788

CONCURRENT DEALKYLATION OF AROMATIC HYDROCARBONS AND DEHYDROGENATION OF NAPHTHENIC HYDROCARBONS

James H. McAteer, Cranford, and Charles E. Morrell, Westfield, N. J., assignors to Standard Oil Development Company, a corporation of Delaware No Drawing. Application July 26, 1949, Serial No. 106,978

10 Claims. (Cl. 260—668)

This invention relates to a novel process for effecting the dealkylation of alkylated aromatic compounds by simultaneously effecting the dehydrogenation of alicyclic, and particularly naphthenic, compounds.

Hydrogen transfer reactions are known which involve the reaction between hydrogen acceptors, such as olefins or aromatics, with hydrogen donors, such as alcohols or naphthenes, in the presence of various catalysts active for hydrogenation and dehydrogenation. These reactions affect the relative saturation of the carbon atoms of the hydrogen donor and acceptor but do not affect the total carbon numbers of the reacting compounds, i. e., they do not result in a selective fission of carbon to carbon linkages.

This invention is a process for dealkylating alkylated aromatic compounds by a double decomposition with alicyclic, and particularly naphthenic, compounds under conditions that prevent hydrogenation of the aromatic nucleus. The reaction is carried out in the vapor phase with the use of a catalyst comprising, preferably, activated carbon.

In contrast to the conventional hydrogen transfer reactions, in which hydrogen is transferred from saturated carbons of one reactant to unsaturated carbons of another reactant, the process of the present invention is carried out to avoid such a transfer, because the presence of free hydrogen and addition of hydrogen to unsaturated carbon atoms interferes with the desired dealkylation. It has been shown that the dealkylation of the mono- and polyalkylated aromatic compounds proceeds most advantageously when the two essential reactants, i. e., the naphthenic or alicyclic compound and the alkyl aromatic compound, are substantially free of other reactive substances, such as olefins and aromatic compounds, corresponding to the dealkylated, alkyl aromatic compound, or free hydrogen, when reaction is initiated. Thus, in the desired reaction, the efficiency is greater when the hydrogen, given up by the alicyclic compound, is utilized to a greater extent in combining with the alkyl groups split from the aromatic compounds and in replacing split-off alkyl groups in the aromatic nuclei.

Experimental data show that when the desired reaction is obtained, the alicyclic or naphthenic compound is dehydrogenated at a rate closely correlated to the rate at which the alkyl aromatic compound is dealkylated. It is therefore necessary to avoid undesired side reactions by removing the products as they are formed from the reaction zone, these products being essentially and principally the partially dehydrogenated alicyclic compound or aromatic compound resulting therefrom, the paraffinic compound formed from the split-off alkyl group, and the dealkylated aromatic compound, with only a restricted amount of hydrogen.

It can be seen that the present invention provides a useful technique for obtaining a controlled dehydrogenation of alicyclic compounds and controlled dealkylation of alkylated aromatic compounds insofar as it involves proportioning these reactants to the exclusion of other reactive substances, so that a pair of hydrogen atoms is given off by the alicyclic compound for each alkyl group split off from the alkylated aromatic compound.

The process of this invention can therefore be carried out under much milder conditions than is necessitated when alkylated aromatic compounds are dealkylated with hydrogen. The milder conditions result in much greater selectivities and a great diminution in undesirable degradation reactions.

The alicyclic compounds that may be employed are those in general having five or more alicyclic carbon atoms and those that are also relatively more saturated than the aromatic compound being dealkylated. Typical alicyclic compounds usable in this invention are polycyclic naphthenes such as decalin; polycyclic compounds in which at least one ring is non-aromatic, e. g., tetralin, hydrindene; unsaturated hydrocarbons containing non-aromatic rings, the unsaturation being either in the ring or side chain; mixtures of these and mixtures rich in these with other types of hydrocarbons.

The naphthenic hydrocarbons that may be employed as hydrogen donors are preferably those having at least five or six cyclic carbon atoms, i.e., cyclopentanes or cyclohexanes. Naphthenic rings having four or less carbon atoms are too unstable to work satisfactorily. Alkylated derivatives of the indicated naphthenes can also be employed. The naphthenes are dehydrogenated during the course of the reaction to cycloolefinic or aromatic products. Thus, cyclohexane is converted to benzene and cyclopentane to cyclopentenes and cyclopentadiene. Alkylated naphthenes undergo both dehydrogenation and appreciable dealkylation.

The alkylated aromatic compounds that are dealkylated by the process of this invention are benzenoid hydrocarbons and also those belonging to the polycyclic series, such as, e. g., diphenyl, naphthalene, anthracene, phenanthrene, etc. Primary normal alkyl groups containing less than about four carbon atoms are removed selectively as the corresponding alkanes. When higher normal alkyl groups, or branched groups are present in the aromatic nucleus, some fragmentation of the alkyl groups occurs with the production of alkane hydrocarbons of lower molecular weight than correspond to the original alkyl groups. Polyalkylated aromatic hydrocarbons are dealkylated in a stepwise manner.

The preferred catalyst is activated carbon, since this gives a minimum of degradative cracking reactions. The carbon may be activated by the use of steam, carbon dioxide or other inert gases at elevated temperatures. The activated carbon is derived from a variety of sources, including vegetable matter decomposition products, lignite, petroleum sources, bituminous coal, or selected pure organic compounds. The catalyst should have a high surface area and a relatively low content of volatile matter. Inorganic materials are normally present in activated charcoal from a large number of sources and include, for example, oxides or salts of such elements as zinc, copper, calcium, iron, chromium, aluminum, nickel, etc. Salts of these metals may conveniently be employed as promoters in the original process of activating the carbon. It is believed that these inorganic materials have no deleterious effect on the reaction of this invention and in certain instances are believed to have a promoting effect. The cataylst is normally regenerated by stripping with inert gases such as steam, nitrogen, flue gases, etc. at elevated temperatures, i. e., 450°–900° C.

The reaction between the naphthenes and alkylated aromatic compounds is illustrated by the reaction between cyclohexane and toluene.

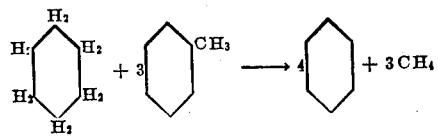

The hydrogen atoms are thus removed from the naphthenes and these atoms are catalytically combined with and substituted for the alkyl groups that are split from the alkylated aromatic compound. Cyclohexane and its higher homologues are particularly adapted for use in the process of this invention because each molecule of cyclohexane contains sufficient hydrogen to cause three carbon to carbon fissions.

The reaction is carried out in vapor phase in the presence of a catalyst of the type which has been described under conditions of temperature, pressure, feed rates, and the like, so chosen as to produce the desired extent of conversion. The equipment employed for this purpose may be of any type known to those skilled in the art for effecting a vapor phase catalytic reaction. Thus, for example, liquid feed is charged to a vaporizer from which the resulting feed vapors pass through a preheating zone and thence into the reaction zone in which the vapors are contacted with the catalyst. The effluent vapors from the reaction zone are cooled and condensed to produce a liquid reaction product and non-condensible gases comprising low molecular weight paraffins and only a small amount of hydrogen. The liquid reaction product is worked up in any suitable manner, for example, by fractionation, adsorption, or crystallization, to recover the desired constituents in the requisite degree of purity. Unchanged or incompletely converted reactants may be recycled together with fresh feed. If desired, an inert diluent such as, for example, a portion of the non-condensible gaseous products may be employed.

It will be understood that the exact conditions employed in carrying out the reaction will be determined by the nature of the feed constituents, the desired conversions per pass and the specific catalyst employed. The reaction is carried out under pressures ranging from subatmospheric to superatmospheric as long as it is conducted in the vapor phase with a low partial pressure of hydrogen, i. e., less than about 150 p. s. i.

In general, the range of temperatures for carrying out the reaction will be of the order of 250°–650° C., and principally between 500° and 600° C. At temperatures below this range, the rate of reaction tends to become impracticably slow and hydrogenation of the aromatic nucleus is favored, whereas, at temperatures higher than this range there is an increased tendency towards the occurrence of side reactions such as thermal cracking. The total feed rates employed will normally lie in the range of 0.1 to 10 liquid volumes per volume of catalyst per hour. The proportion of alicyclic compound to alkylated aromatic compound in the feed is controlled to determine the extent of conversion of both reactants. Generally, about one mole of the naphthenic reactant is mixed with about one to three moles of the aromatic reactant.

The relative concentrations of the naphthenes to the alkylated aromatic compounds in the feed varies with the results desired. Thus, high conversion per pass of alkylated aromatics results from the use of the larger amounts of naphthenes, whereas use of larger amounts of the alkylated aromatic compounds results in high conversion per pass of the naphthenes. The feed materials may be used in a relatively pure form or can be used if diluted with inert materials.

The process may be executed in a batch, intermediate, or continuous manner. Higher over-all yields are obtained with multi-pass processes. The catalyst may be employed in a fixed bed, moving bed, or in a fluidized manner, depending on the type operation desired.

This invention will be better understood by reference to the following tables and examples, indicating the results obtained from the reaction of various naphthenes and alkylated aromatic compounds, including hydrocarbons and other types. The results were obtained after a single-pass operation.

TABLE I

*Dealkylation of aromatic compounds by cyclohexane type compounds*

| Feed: Naphthene | Cyclohexane | Methyl Cyclohexane | Cyclohexane | Cyclohexane | Cyclohexane | Cyclohexane | Cyclohexane | Cyclohexane |
|---|---|---|---|---|---|---|---|---|
| Aromatic Compound | Toluene | Ethyl Benzene | Ethyl Benzene | Ethyl Benzene | Methyl Naphthalene | Mixed Xylenes | $C_9$ Aromatic fraction [1] | m,p-Cresols |
| Naphthene/aromatic, moles per mole | 0.40 | 1.0 | 1.0 | 0.80 | 1.0 | 1.0 | 1.0 | 0.60 |
| Liq. feed, V./V. cat./hr. | 2.2 | 1.2 | 1.7 | 0.75 | 1.5 | 1.9 | 0.65 | 0.63 |
| Catalyst | (2) | (2) | (2) | (2) | (2) | (2) | (3) | (2) |
| Catalyst Temp. °C | 550 | 550 | 550 | 500 | 550 | 550 | 520 | 505 |
| Conversions, per cent: | | | | | | | | |
| Naphthenes | 28 | 48 | 35 | 11 | 29 | 30 | 45 | 27 |
| Alkylated aromatics | 7 | 32 | 27 | 12 | 67 | 29 | 70 | 29 |
| Yields, mole per cent: | | | | | | | | |
| Dehydrogenated naphthenes | 23 | 43 | 31 | 11 | 25 | 24 | 40 | 21 |
| Dealkylated aromatics | 7 | 32 | 27 | 12 | 67 | 29 | 70 | 22 |

[1] 160-170° C. B. P.
[2] Bituminous Activated Charcoal.
[3] Coconut Activated Charcoal.

TABLE II

*Dealkylation of aromatic hydrocarbons by cyclopentane type compounds*

| Feed: Naphthene | Cyclopentane | Methyl Cyclopentane |
|---|---|---|
| Aromatic Hydrocarbon | Ethyl Benzene | Xylenes |
| Naphthene/aromatic, moles per mole | 1.0 | 1.0 |
| Liq. feed, v./v. cat./hr | 1.2 | 0.75 |
| Catalyst | (1) | (1) |
| Catalyst Temp. °C | 550 | 530 |
| Conversions, per cent: | | |
| Naphthenes | 28 | 26 |
| Alkylated aromatics | 13 | 13 |
| Yields, mole per cent: | | |
| Dehydrogenated naphthenes | 28 | 22 |
| Dealkylated aromatics | 13 | 13 |

[1] Bituminous activated charcoal.

TABLE III

*Dealkylation of aromatic hydrocarbons by mixed naphthenes*

| Feed: Naphthene | Straight Run Naphthenic Naphtha [1] | Straight Run Naphthenic Naphtha [1] |
|---|---|---|
| Aromatic Hydrocarbon | Aromatic Kerosene Extract [2] | Aromatic Kerosene Extract [2] |
| Naphthene/aromatic, weight ratio | 0.38 | 0.38 |
| Liq. feed, v./v. cat./hr | 0.75 | 0.75 |
| Catalyst | (3) | (4) |
| Catalyst Temp. °C | 520 | 520 |
| Conversions, Per cent: | | |
| Naphthenes | 17 | 12 |
| Alkylated aromatics | 38 | 11 |
| Yields, Weight Per Cent: | | |
| Dehydrogenated naphthenes | 9 | 4 |
| Dealkylated aromatics | 15 | 10 |

[1] B. P. 45-93° C.
[2] B. P. 200-350° C.
[3] Activated coconut charcoal.
[4] Iron oxide-pumice.

The figures indicate that the dealkylated aromatic compounds produced consisted of practically 100% aromatics indicating an absence of undesirable side reactions and fragmentations. This high selectivity, nearly 100%, should be particularly noted. This is a particular advantage of the process of this invention.

In general, the relative conversion of the alkylated aromatic compound to dealkylated aromatic varies directly with the molecular weight of the alkylated aromatic compound. Thus alpha methyl naphthalene gave a conversion of 7.3 relative to toluene and the former is therefore ideally adapted to be dealkylated by the process of this invention.

Other catalysts than activated carbon may be employed, provided that they do not result in undesirable degradation reactions and do not result in the reaction proceeding in other directions than the one indicated.

It is to be understood that the invention is not limited to the specific examples which have been offered merely as illustrations and that modifications may be made in equipment and conditions within the range specified without departing from the spirit of this invention.

What is claimed is:

1. A process for simultaneously effecting the catalytic dehydrogenation of alicyclic compounds and dealkylation of alkylated aromatic hydrocarbon compounds which comprises reacting an alicyclic hydrocarbon with an alkylated aromatic compound in the vapor phase at a temperature of 500° to 600° C. in the presence of an activated carbon catalyst with a liquid feed to catalyst ratio of 0.1 to 10 v./v./hr. for a length of time to produce the desired dealkylated compounds, said alicyclic hydrocarbon having at least 5 alicyclic carbon atoms and being more saturated than the alkylated aromatic compound being dealkylated.

2. A process for simultaneously effecting the catalytic dehydrogenation of alicyclic compounds and dealkylation of alkylated aromatic compounds which comprises reacting a naphthenic hydrocarbon with an alkylated aromatic compound in the vapor phase at a temperature in the range of 500° to 600° C. in the presence of an activated carbon catalyst with a liquid feed to catalyst ratio of 0.1 to 10 v./v./hr., for a length of time to produce the desired dealkylated compounds.

3. A process for effecting the catalytic dehydrogenation of alicyclic compounds and dealkylation of alkylated aromatic compounds which comprises reacting a naphthenic hydrocarbon having at least five cyclic carbon atoms with an alkylated aromatic hydrocarbon in the vapor phase at a temperature in the range of 500° to 600° C. in the presence of an activated carbon catalyst with a liquid feed to catalyst ratio of 0.1 to 10 v./v./hr. for a length of time to produce the desired dealkylated compounds, whereby the alicyclic hydrocarbon is dehydrogenated as the alkylated aromatic compound is dealkylated.

4. A process for the simultaneous production of benzene and ethane which comprises reacting cyclohexane and ethyl benzene in the vapor phase at a temperature in the range of 500°-600° C. in the presence of an activated carbon catalyst with a liquid feed to catalyst ratio of 0.1 to 10 v./v./hr. for a length of time to produce the benzene so that hydrogen from the cyclohexane is combined with ethyl groups split off the ethyl benzene.

5. A process for the simultaneous production of methane and benzene which comprises reacting cyclohexane and toluene in the vapor phase at a temperature in the range of 500°–600° C. in the presence of an activated carbon catalyst with a liquid feed to catalyst ratio of 0.1 to 10 v./v./hr. for a length of time to produce the benzene so that hydrogen from the cyclohexane is combined with methyl groups split off the toluene.

6. A process for the simultaneous production of methane and naphthalene which comprises reacting alpha methyl naphthalene and cyclohexane in the vapor phase at a temperature in the range of 500°–600° C. in the presence of an activated carbon catalyst with a liquid feed to catalyst ratio of 0.1 to 10 v./v./hr. for a length of time to produce the naphthalene, so that hydrogen from the cyclohexane is combined with methyl groups split off the alpha methyl naphthalene.

7. A process for obtaining a controlled dehydrogenation of an alicyclic hydrocarbon compound simultaneously with a realkylation of an alkylated aromatic compound, which comprises admixing the alicyclic compound with the alkylated aromatic compound in a proportion such that the alicyclic compound supplies two hydrogen atoms for each alkyl group to be split from the alkylated aromatic compound, passing the resulting mixture of the alicyclic compound and alkylated aromatic compound substantially free from other reactive sbstances in vapor phase into a reaction zone maintained at a temperature of 500° to 600° C. in the presence of an activated carbon catalyst with a liquid feed to catalyst ratio of 0.1 to 10 v./v./hr. for a length of time to produce the desired dealkylated compound, and removing from the reaction zone the gaseous products of the reaction as they are formed, comprising principally the dehydrogenated alicyclic compound, the dealkylated aromatic compound, and paraffin formed by split-off alkyl groups combined with hydrogen from the alicyclic compound.

8. A process as in claim 7 in which the alicyclic compound is a naphthenic hydrocarbon having at least 5 cyclic carbon atoms.

9. A process as in claim 8 in which the alkylated aromatic compound being dealkylated is a hydrocarbon.

10. A process for obtaining a controlled dehydrogenation of naphthenic hydrocarbons containing at least five cyclic carbon atoms simultaneously with the dealkylation of alkylated aromatic compounds which comprises the steps of admixing a predominantly organic mixture containing naphthenic hydrocarbons with a predominantly organic mixture containing the alkylated aromatic compounds in a proportion such that the naphthenes supply two hydrogen atoms for each alkyl group to be split from the alkylated aromatic compounds; passing the resulting mixture in vapor phase into a reaction zone at a temperature in the range of 500° to 600° C. in the presence of an activated carbon catalyst with a liquid feed to catalyst ratio of 0.1 to 10 v./v./hr. for a length of time to produce the desired dealkylated compounds, at which temperature the naphthenes undergo dehydrogenation at a rate controlled by the dealkylation of the alkylated aromatics, and removing from the reaction zone the gaseous products of the reaction as they are formed, comprising principally the dehydrogenated naphthenes, dealkylated aromatics and paraffins formed by split-off alkyl groups combined with hydrogen from the alicyclic compound.

JAMES H. McATEER.
CHARLES E. MORRELL.

REFERENCES CITED

The following references are of record in the file of this patent:

UNITED STATES PATENTS

| Number | Name | Date |
| --- | --- | --- |
| 2,168,840 | Groll | Aug. 8, 1939 |
| 2,222,632 | Sachanen et al. | Nov. 26, 1940 |
| 2,223,133 | Sachanen et al. | Nov. 26, 1940 |
| 2,257,920 | Sachanen et al. | Oct. 7, 1941 |
| 2,425,559 | Passino et al. | Aug. 12, 1947 |